April 15, 1958  J. M. ALGINO  2,830,766
HEAT MOTOR CONTROLLED THERMAL PULSE VALVE
Filed Oct. 22, 1956  2 Sheets-Sheet 1

INVENTOR
Joseph M. Algino
By Hill, Sherman, Meroni, Gross & Simpson
Attys

April 15, 1958   J. M. ALGINO   2,830,766
HEAT MOTOR CONTROLLED THERMAL PULSE VALVE
Filed Oct. 22, 1956   2 Sheets-Sheet 2
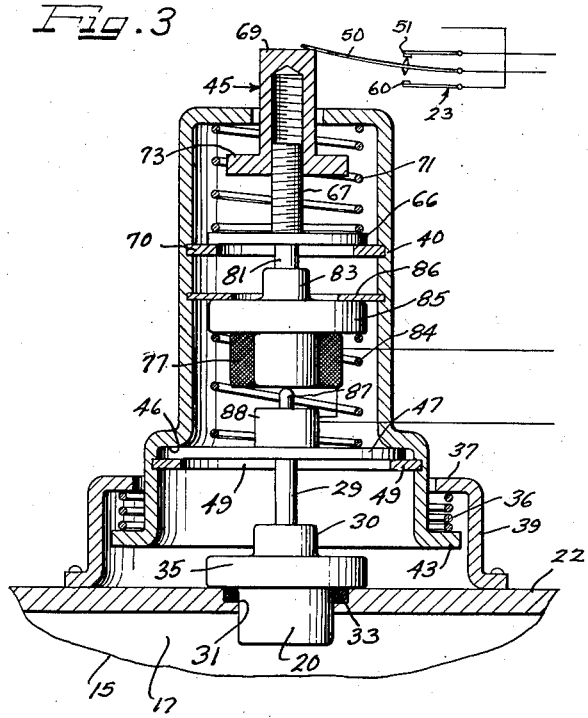
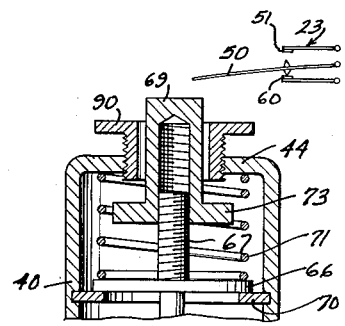
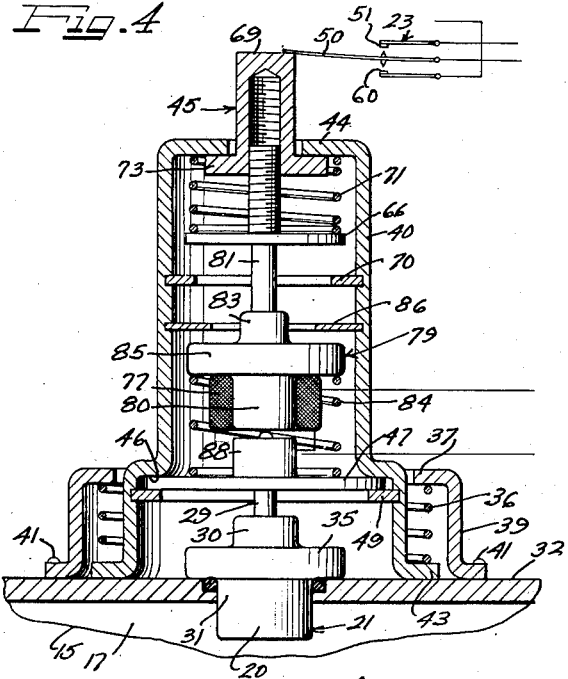
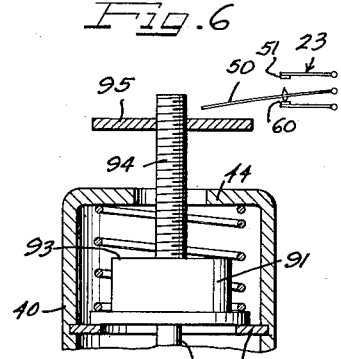
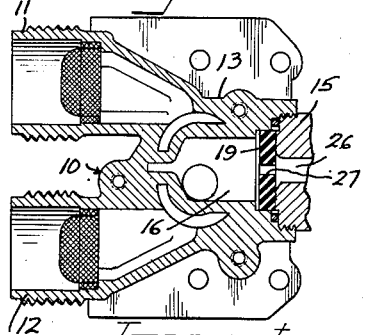
Inventor
Joseph M. Algino

United States Patent Office 2,830,766
Patented Apr. 15, 1958

2,830,766

HEAT MOTOR CONTROLLED THERMAL PULSE VALVE

Joseph M. Algino, Chicago, Ill., assignor to The Dole Valve Company, Chicago, Ill., a corporation of Illinois Application October 22, 1956, Serial No. 617,345

12 Claims. (Cl. 236—12)

This invention relates to improvements in mixing valves and more particularly relates to improvements in valves for pulsing successive quantities of hot and cold water under thermostatic control for mixture in a common container such as the tub of a washing machine and the like.

A principal object of the invention is to provide a new and improved thermostatic valve for more efficiently mixing hot and cold water by supplying successive quantities of hot and cold water under thermostatic control for time intervals determined by the required temperature of a mixed water collected in a common container for the hot and cold water, in which the proportions of the hot and cold water under certain conditions are under the control of a heat motor.

Another object of the invention is to provide a thermostatic cyclically controlled pulsing valve for supplying successive quantities of hot and cold water to a washing machine tub and the like under the cyclic control of the machine, so arranged as to provide a final mixed water at temperatures independently preselected for the separate washing and rinsing operations between the temperatures of the hot and cold water entering the valve, in which the water temperature for the rinsing operation is under the control of a heat motor.

A still further object of the invention is to provide an improved form of heat motor controlled thermal pulse valve in which the temperature of the water delivered by the valve is alternately at the temperature of the hot water entering the valve and the temperature of the cold water entering the valve, and in which the delivery of the hot and cold water may be independently proportioned for the separate washing and rinsing operations, to attain tempered water at selected temperatures for the separate washing and rinsing operations.

Still another object of the invention is to provide a thermal pulse valve in which the flow of water over a thermostat effects the successive flow of hot and cold water in opposite relation to the temperature of the water flowing over the thermostat, and in which a heat motor operates to effect a different controlled temperature of the water delivered under control of the thermal element.

Still another object of the invention is to provide a thermal pulse valve for supplying water to washing machines and the like in successive quantities of hot and cold water, the proportions of which are determined by the required temperature of the mixed water in the washing machine tub, and in which the proportions of hot and cold water delivered for the washing and rinsing operations may be independently preselected.

Still another object of the invention is to provide an improved form of thermostat controlling the flow of hot and cold water for mixing purposes in which the flow is controlled for certain operations directly by a thermal element sensing the temperature of the water flowing through a passageway, and in which the flow is varied for certain other operations by operation of a heat motor operable to modify the control of the flow by the thermal element.

These and other objects of the invention will appear from time to time as the following specification proceeds and with reference to the accompanying drawings wherein:

Figure 2 is a fragmentary horizontal sectional view taken through the valve;

Figure 3 is a fragmentary sectional view taken through the thermostatic control means for the valve, showing the thermostat in heat sensing relation with respect to the water flowing through the outlet from the valve, and heated to an extended position, to change the flow from water at one temperature to that of another temperature;

Figure 4 is a view somewhat similar to Figure 3, but showing the heat motor energized to effect a different delivery volume of hot and cold water through the valve during an operation, such as a rinsing operation in an automatic washing machine and the like;

Figure 1:
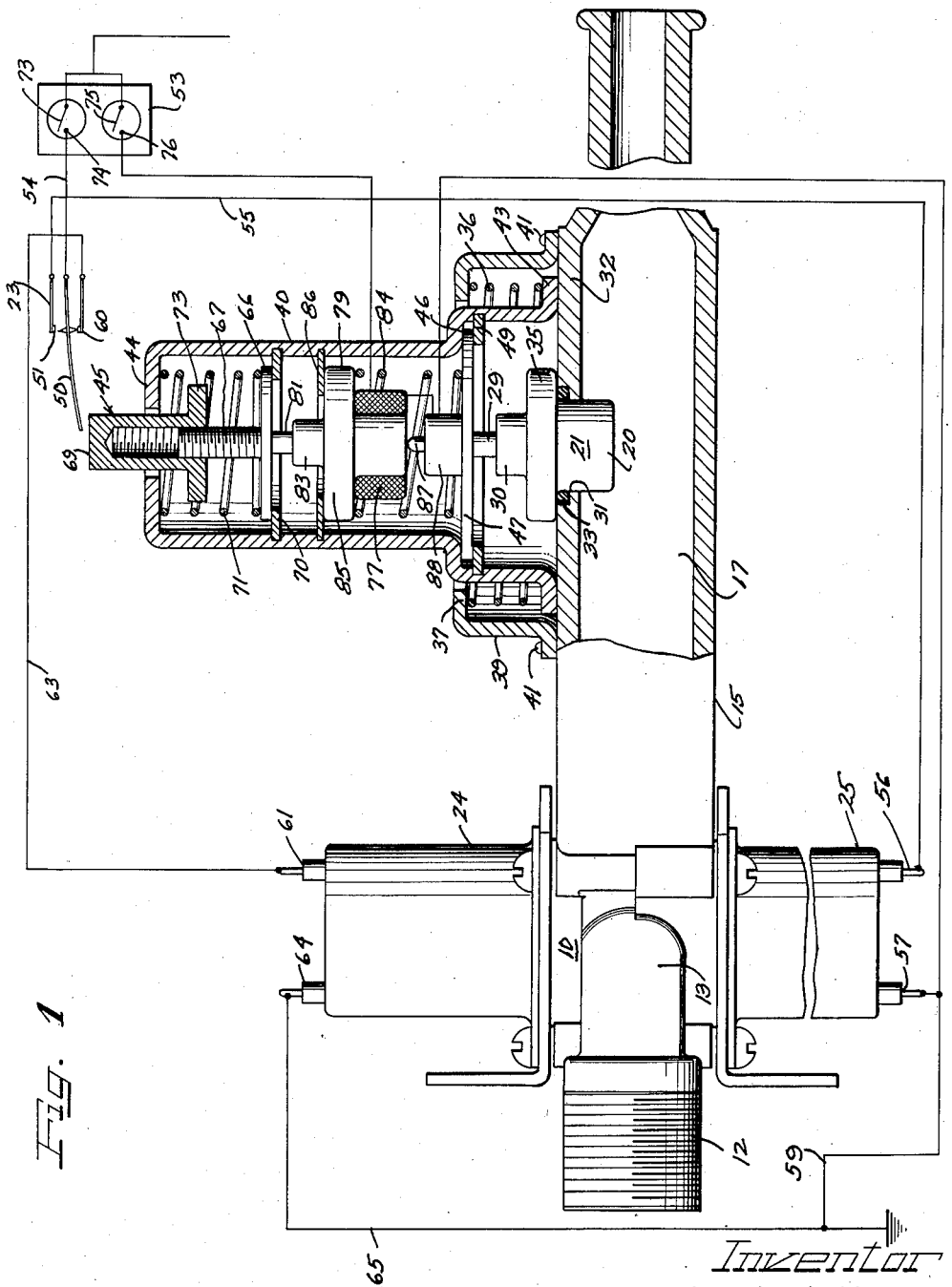
Figure 1 is a view in side elevation of a valve and control therefor constructed in accordance with the invention, with certain parts of the control shown in diagrammatic form.

Figure 5 is a fragmentary sectional view, illustrating a modification of the invention, in which the temperature of both the mixed wash water and the mixed rinse water may be preselected; and Figure 6 is a view somewhat similar to Figure 5, illustrating still another modification of the invention in which the temperature of the wash water may be selected and in which a constant difference in temperature between the wash and the rinse water is attained.

In the embodiment of the invention illustrated in Figures 1 and 2 of the drawings, I have shown a valve 10, which may be a solenoid controlled mixing valve having hot and cold water inlets 11 and 12 respectively, leading into a body 13 of the valve and having an outlet fitting 15, shown as being detachably secured to the valve body in fluid communication with an outlet 16 from said valve body.

The outlet fitting 15 has an outlet passageway 17 extending therealong having a flow control device 19 at the inlet end thereof to assure a uniform rate of flow of hot or cold water along a casing 20 of a thermal element 21, regardless of variations in pressure of the hot and cold water at the source.

The thermal element 21 serves to operate a switch 23 to alternately energize hot and cold water solenoids 24 and 25 of the valve 10, to effect the flow of the cold water along the passageway 17 upon heating of the thermal element by the hot water flowing therethrough, and to then effect the flow of hot water along the passageway 17, upon the cooling of said thermal element, as will hereinafter more clearly appear as this specification proceeds.

The valve 10 is herein shown as being a solenoid controlled valve like that shown and described in Patent No. 2,712,324, which issued to James K. Lund on July 5, 1955, in which the opening and closing of hot and cold water diaphragm valves (not shown) is under the control of the respective solenoids 24 and 25, as is clearly shown in the above patent, so not herein shown or described further.

The flow control device 19 is shown as being in the form of the resilient annulus seated against the inner end of the fitting 15 concentric with a reduced diameter passageway 26 of said fitting. Said flow control device may be made from rubber or from an elastomer and the like, which will deform a central orifice 27 upon increases in pressure thereon, to reduce the cross-sectional area of the orifice as the pressure acting on said flow control device increases, as in Patent No. 2,454,929, which issued to Leslie A. Kempton on November 30, 1948.

The thermal element 21 is shown as being of the so-called wax or power type of thermal element wherein a fusible thermally expansible material (not shown) carried in the casing 20 for the element, acts against a membrane or deformable member (not shown), to extend a power member 29 from a cylinder 30 of the thermal element, as in the Vernet Patent No. 2,368,181, dated January 30, 1945.

The thermal element 21 is shown as extending through an aperture 31 in a wall 32 of the passageway member 15, with the casing 20 in heat sensing relation with respect to the flow of water through the outlet passageway 17. An O-ring 33 is shown as engaging a clamping 35 for the thermal element and sealing the thermal element to the aperture 31.

The thermal element 21 is maintained in position within the aperture 31 in heat sensing relation with respect to the water flowing through the outlet passageway 17 by a compression spring 36, which also serves as a return spring for the power member or piston 29 of the thermal element. The compression spring 36 is herein shown as being seated at its outer end on an inwardly extending flange 37 of a retainer 39 encircling a carrier 40 and accommodating outward movement of said carrier with respect to the retainer 39 upon extensible movement of the power member 29 from the cylinder 30. The retainer 39 is shown as abutting the outside of the wall 32 of the passageway member 15 and as being suitably secured thereto as by machine screws 41. The opposite end of the compression spring 36 from the flange 37 is seated on an outwardly extending flange 43 of the carrier member 40, to bias said carrier member into engagement with the wall 32 of the passageway member 15, as well as to return the power member 29 with respect to the cylinder 30, upon predetermined reductions in temperature.

The carrier member 40 is of a generally cylindrical form, having the outwardly extending flange 43 at its inner end and having an inwardly extending annular portion 44 at its upper end through which an operating member 45 extends, and is adjustably movable with respect thereto, as will hereinafter more clearly appear as this specification proceeds.

The carrier 40 also has a shoulder 46 extending outwardly from the main body thereof, engaged by a plate 47, retained in engagement with said shoulder as by a snap ring 49. The plate 47 is maintained in abutting engagement with the end of the power member 29 by the spring 36 and forms an abutment for said power member to effect extensible movement of the carrier 40 with respect to the passageway member 15 upon certain increases in temperature, to engage the operating member 45 with a movable switch arm 50 of the switch 23. Engagement of the switch arm 50 by the operating member 45 upon extensible movement of the power member 29 will complete a circuit through a contact 51 of said switch and effect the energization of the cold solenoid 25 under the control of a timer 53, connected with the movable switch arm 50 through a conductor 54 and through a conductor 55, connecting the stationary contact 51 with a terminal 56 of the solenoid 25. A second terminal 57 of the solenoid 25 is connected with ground through a conductor 59.

The switch 23 may be a well known form of double throw snap action switch of the over travel type, in which the contact blades of the switch are flexible to stand some additional deflection after contact is made, and in which the switch arm 50 of the switch is biased into engagement with a hot contact 60. The hot contact 60 is connected with a terminal 61 of the solenoid 24 through a conductor 63 to energize the solenoid 24 upon reductions in temperature and engagement of the switch arm 50 with the hot contact 60. A second terminal 64 of the solenoid 24 is connected to ground through a conductor 65.

The operating member 45 includes a plate 66 having a threaded rod 67 extending outwardly therefrom and threaded within a flanged button or plunger 69 of said operating member. The plate 66 abuts a ring 70, which may be a snap-ring snapped in position in the inner wall of the carrier 40. A compression spring 71 is provided to bias the plate 66 into engagement with the ring 70. The compression 71 is shown as being seated on the plate 66 at one end and as encircling a flange 73 of the plunger 69, and as being seated on the inside of the inwardly extending annular portion 44 of the carrier 40 at its opposite end. The plate 66 seated against the ring 70 and biased into engagement therewith by the spring 71, will thus effect outward movement of the plunger 69 to operate the switch 50 upon extensible movement of the power member 29 from the cylinder 30, as the thermal element 21 is heated by hot water flowing through the passageway 17. This will deenergize the hot water solenoid 24 and energize the cold water solenoid 25 to effect the flow of cold water through the passageway 17.

Turning of the plunger 69 with respect to the threaded rod 67 may thus change the time intervals or proportion of the flow of hot and cold water through the outlet 17, to vary the temperature of the final mixed water in accordance with the temperature of the water entering the valve. Thus, as the plunger 69 is turned to be extended from the annular portion 44 of the carrier 40, said plunger will come into engagement with the switch arm 50 with decreasing travel of the power member 29, with the result that the circuit to the hot water solenoid 24 will be broken in a reduced time interval and less hot water will flow through the passageway 17. This will result in a final reduction in temperature of the mixed water.

As the plunger 69 is turned in an opposite direction, to be retracted with respect to the carrier 40, it will take a longer travel of the power member 20 to engage the switch arm 50 and deenergize the hot water solenoid 24. The time of the flow of hot water through the passageway 17 will thus be increased and the flow of cold water through the passageway will be decreased, due to the shorter travel of the power member 29 inwardly with respect to the casing 30 required to deenergize the cold water solenoid 25. This will increase the temperature of the final mixed water.

It is, of course, understood that the length of time the hot water solenoid is energized depends upon the temperature of the hot water. If the hot water flowing along the passageway 17 is at a high temperature, the thermal element will heat more quickly and deenergize the hot water solenoid 24 sooner. If the hot water is at a low temperature, it will take longer to heat the thermal element with the result that the cold water solenoid 25 will be deenergized a longer period of time, and more hot water will enter the passageway 17 and flow to the common container for hot and cold water. The same governs for the flow of cold water along the passageway 17, with the result that the thermal element 21 controls the flow in accordance with the temperature of the hot and cold water and compensates for variations in temperature of the hot and cold water, resulting in a uniform temperature of the mixed water in the container therefor.

The timer 53 may be the cyclic timer of a washing machine and is diagrammatically shown as having a movable switch arm 73 movable into engagement with a stationary contact 74, to complete a circuit to the movable switch arm 50 through the conductor 54, during both the washing and the rinsing operations. The timer 53 also has a movable switch arm 75 engageable with the stationary contact 76 during the rinsing cycle of the machine to complete an energizing circuit to a resistor heater 77 for a heat motor 79.

The heat motor 79, as herein shown, is in the form of a thermal element like the thermal element 21 and includes a casing 80 containing a thermally expansible material and encircled by the resistor heater 77, to heat the thermally expansible material and effect extensible movement of a power member 81 from a cylinder 83 of the thermal element. The heat motor 79 is maintained in position within the carrier 40 by a compression spring 84 interposed between the plate 47 and a clamping ring 85 of the heat motor, and biasing said clamping ring into engagement with a snap-ring 86 within the carrier 40. The bottom of the casing 80 of the heat motor 79 abuts a depressible operating button 87 of a switch 88, to depress said button and deenergize the resistor heater 77, upon movement of the heat motor against the bias of the spring 84.

When the cyclic timer for the washing comes in to its rinsing cycle, the movable switch arm 75 will close a circuit through the stationary contact 76 and energize the resistor heater 77 for the heat motor 79. The power member 81 will then be extensibly moved with respect to the cylinder 83 and move the plunger 69 outwardly with respect to the carrier 40 until the flange 73 of said plunger comes into engagement with the annular wall portion 44 of the carrier 40. Continued heating of the heat motor 79 will effect continued extensible movement of the power member 81 thereof, and cause the heat motor to move backwardly against the compression spring 84, to depress the switch button 87 and deenergize the resistor heater 77, as shown in Figure 4. As the heat motor cools, the compression spring 84 will move the casing 80 away from the switch button 87 and will engage the clamping ring 85 with the snap-ring 86. The resistor heater 77 will then again be energized and the heat motor will again back away from the snap-ring 86 to again depress the switch button 87 and deenergize said heat motor. The heat motor 79 will thus cycle back and forth and maintain the flange 73 in engagement with the annular portion 44 of the carrier 40 during the rinsing cycle. Engagement of the flange 73 with the annular portion 44 of the carrier 40 will position the plunger 69 closer to the switch arm 50 of the switch 23 than in the position shown in Figure 1 and will maintain a fixed temperature of the rinse water, which will be lower than the temperature of the wash water, due to the decreased travel of the power member 29 of the thermal element 21 required to deenergize the hot solenoid. A rinse water temperature may thus be attained which is lower than the temperature for the wash water, and the rinse water may be held to a fixed temperature which is lower than the temperature of the wash water in accordance with the position of adjustment of the plunger 69 on the threaded rod 67.

In the modification of the invention shown in Figure 5, I have shown an arrangement whereby the wash and rinse temperatures may be independently adjusted with respect to each other, with the result that a rinse temperature may be preselected which is equal to or lower than the wash temperature, and a wash temperature may be preselected which is equal to or higher than the rinse temperature.

In this form of the invention a hollow nut 90 is shown as being threaded within the opening formed by the inner margin of the annular portion 44 of the carrier 40. The plunger 69 is exactly like the plunger in the form of the invention illustrated in Figures 1 through 4 and is threaded on the threaded rod 67 and extends through the hollow interior of the nut 90. As the nut 90 is turned to move inwardly of the carrier 40, the distance required for the power member 81 of the heat motor 79 to move the plunger 69 to engage the flange 73 of said plunger, will be reduced, with the result that the rinse water attained during the rinsing operation will be increased over the temperature that would be attained if the flange 73 was required to move into engagement with the annular portion 44, as in the form of my invention shown in Figures 1 through 4.

When the nut 90 is turned into such a position that the flange 73 is engaged with said nut, with no extensible movement of the power member 81, the temperature of the rinse water will be the same as the temperature of the wash water. The farther away the nut 90 is moved from the flange 73 the greater will be the difference in temperature between the rinse water and the wash water, it being understood that as the nut 90 is moved away from the flange 73 the temperature of the rinse water is decreased.

In the modification of the invention illustrated in Figure 6, I have shown a temperature adjustment arrangement in which the difference in temperature between the wash water and the rinse water is constant. In this form of the invention, a stop member 91 is seated on the snap-ring 70 within the carrier 40, and has an upper surface 93 engageable with the annular portion 44 of said carrier upon extensible movement of the power member 81 with respect to the cylinder 83 of the heat motor 79. A threaded rod 94 is shown as extending through the opening formed by the inner margin of the annular portion 44 and as having an adjusting nut 95 adjustably mounted thereon.

The temperature of the wash water may thus be adjusted to the required temperature by turning the nut 95 on the threaded nut 94 and varying the distance of said nut from the switch arm 50 of the switch 23. Since the space between the surface 93 and the annular portion 44 is always fixed, the difference between the wash water temperature and rinse water temperature will be a constant temperature difference, and the rinse water temperature will be lower than the wash water temperature by a fixed amount.

It will be understood that modifications and variations in the present invention may be effected without departing from the spirit and scope of the novel concepts thereof.

I claim as my invention:

1. In a thermostat, a passageway member adapted to have hot and cold water alternately flow therethrough, a first thermal element mounted on said passageway member in heat association with the water flowing therethrough and having a power member on the outside of said passageway member extensible in the temperature range of operation of said thermal element, a movable carrier on the outside of said passageway member, spring means engaging said carrier with said power member and returning said power member upon certain reductions in temperature, an operating member movably mounted on said carrier, a switch in spaced relation with respect to said operating member and operated thereby upon extensible movement of said power member to change the flow of water through said passageway member, a second thermal element movably mounted in said carrier and having an extensible power member having operative connection with said operating member, and a resistor heater energizable to heat said second thermal element and effect extensible movement of the power member thereof, to position said operating member to vary the proportions of the hot and cold water flowing through said passageway member from the proportions attained solely by operation of said first thermal element, and a second switch operated by said second thermal element and periodically deenergizing said electrically energizable means upon heating of said second thermal element for a predetermined travel of the power member thereof, to maintain said operating member in an adjusted position of operation.

2. In a thermostat particularly adapted to control the alternate flow of hot and cold water for discharge into a common container to attain a tempered water of a selected temperature, a passageway member for attachment to the discharge from a valve and the like, a first thermal element mounted on said passageway member in heat association with the water flowing therethrough and having a power member on the outside of said passageway member, extensible in the temperature range of operation of said thermal element, a movable carrier on the outside of said passageway member, spring means yieldably maintaining said carrier in engagement with said power member and returning said power member upon reductions in temperature, an operating member movably mounted in said carrier, a second thermal element movably mounted within said carrier and having an extensible power member, spring means biasing said operating member in retracted relation with respect to said carrier and into engagement with said power member of said second thermal element, and electrically energizable means for heating said second thermal element and bringing said operating member into engagement with said carrier, to effect a change in the proportions of hot and cold water flowing through said passageway member and a resultant change in temperature of the mixed water.

3. In a thermostat particularly adapted to control the alternate flow of hot and cold water for mixing in a common container to attain mixed water at a selected temperature, a passageway member for attachment to the discharge from a hot and cold water valve, a thermal element mounted in heat association with the water flowing through said passageway member and having a power member on the outside of said passageway member extensible in the range of operation of said thermal element, a movable carrier on the outside of said passageway member, spring means engaging said carrier with said power member and returning said power member upon certain reductions in temperature of the water flowing through said passageway member, an operating member mounted in said carrier for extensible movement with respect thereto, a second thermal element movably mounted within said carrier and having an extensible power member, spring means biasing said operating member in retracted relation with respect to said carrier and into engagement with said power member of said second thermal element, spring means yieldably biasing said second thermal element in a predetermined position within said carrier, a resistor heater energizable to heat said second thermal element and effect extensible movement of the power member thereof, and a switch within said carrier operated by retractible movement of said second thermal element against said last mentioned spring means for deenergizing said thermal element and accommodating said spring means to return said thermal element to its initial position.

4. In a thermostat particularly adapted to control the alternate flow of hot and cold water for mixture in a common container to obtain a tempered water at a selected temperature, a passageway member for attachment to the discharge from a valve and the like, a thermal element mounted on said passageway member in heat sensing relation with respect to the water flow therethrough, said first thermal element having a power member on the outside of said passageway member extensible in the temperature range of operation of said thermal element, an operating member movably mounted on said carrier member for extensible movement with respect thereto, stop means limiting extensible movement of said operating member with respect to said carrier, a second thermal element mounted within said carrier and having an extensible power member, spring means biasing said operating member in retracted relation with respect to said carrier and into engagement with said power member of said second thermal element, a resistor heater electrically energizable to heat said second thermal element and extend said operating member with respect to said carrier and engage said stop means with said carrier, spring means biasing said thermal element into position to maintain the power member thereof in engagement with said operating member upon retractible movement of said power member and accommodating retractible movement of said second thermal element upon engagement of said stop means with said carrier, and a switch deenergized by retractible movement of said second thermal element for periodically deenergizing said resistor heater.

5. In a thermostat particularly adapted to control the alternate flow of hot and cold water for mixture into a common container at a selected temperature, a passageway member for attachment to the discharge from a valve and the like, a thermal element mounted in heat sensing relation with respect to the flow of water through said passageway member and having a power member on the outside of said passageway member extensible in the temperature range of operation of said thermal element, a movable carrier on the outside of said passageway member and having engagement with said power member, spring means returning said power member and maintaining said carrier in engagement therewith, an operating member extensibly movable with respect to said carrier, stop means limiting extensible movement thereof, a second thermal element movably mounted within said carrier and having an extensible power member, spring means biasing said operating member in retracted relation with respect to said carrier, a fixed abutment within said carrier, spring means biasing said second thermal element toward said fixed abutment and accommodating movement thereof away from said fixed abutment, said power member of said second thermal element having operative connection with said operating member to move said operating member to engage said stop means with said carrier, a resistor heater for heating said second thermal element and effect extensible movement of the power member thereof to move said operating means to the limit of movement thereof with respect to said carrier, and a switch in the energizing circuit to said resistor heater and operated to deenergize said resistor heater upon movement of said operating member into engagement with said stop means and retractible movement of said second thermal element against its biasing spring, to maintain said operating member in engagement with said stop means to attain a selected temperature of the mixed water.

6. In a thermostat particularly adapted to control the alternate flow of hot and cold water for discharge into a common container for tempering purposes, a passageway member for attachment to the discharge from a valve and the like, a thermal element mounted in heat sensing relation with the flow of water through said passageway member and having a power member on the outside of said passageway member extensible in the temperature range of operation of said thermal element, a hollow carrier movably mounted on said passageway member and extending over said power member, a partition within said carrier engageable with said power member, a retainer extending about said carrier, a spring seated on said retainer and carrier and biasing said carrier into engagement with said passageway member and returning said power member upon reductions in temperature, an abutment within said carrier spaced along said carrier outwardly from said partition, a second thermal element within said carrier, spring means interposed between said partition and second thermal element and biasing said second thermal element into engagement with said abutment, an operating member movably mounted within said carrier and extending outwardly therefrom, stop means limiting outward movement of said operating member, spring means biasing said operating member into engagement with said power member of said second thermal element, electrically energizable means for heating said second thermal element, to extend said operating member with respect to said carrier and into engagement with said stop means to effect retractible movement of said second thermal element with respect to said abutment, and means operated by retractible movement of said thermal element for deenergizing said electrically energizable means and accommodating said thermal element to again engage said abutment and maintaining said operating member in engagement with said stop means.

7. In a thermostat particularly adapted to control the alternate flow of hot and cold water for discharge into a common container for tempering purposes, a passageway member for attachment to the discharge from a valve and the like, a thermal element mounted in heat sensing relation with the flow of water through said passageway member and having a power member on the outside of said passageway member extensible in the temperature range of operation of said thermal element, a hollow carrier movably mounted on said passageway member and extending over said power member, a partition within said carrier engageable with said power member, a retainer extending about said carrier, a spring seated on said retainer and carrier and biasing said carrier into engagement with said passageway member and returning said power member upon reductions in temperature, an abutment within said carrier spaced along said carrier outwardly from said partition, a second thermal element within said carrier, spring means interposed between said partition and second thermal element and biasing said second thermal element into engagement with said abutment, an operating member movably mounted within said carrier and extending outwardly therefrom, stop means limiting outward movement of said operating member, spring means biasing said operating member into engagement with said power member of said second thermal element, electrically energizable means for heating said second thermal element, to extend said operating member with respect to said carrier and into engagement with said stop means to effect retractible movement of said second thermal element with respect to said abutment, and means operated by retractible movement of said thermal element for deenergizing said electrically energizable means and accommodating said thermal element to again engage said abutment and maintaining said operating member in engagement with said stop means, comprising a switch on said partition and connected in the energizing circuit for said electrically energizable means and having a button engageable with said thermal element and operable to operate said switch to deenergize said electrically energizable means upon movement of said thermal element away from said abutment.

8. In a thermostatically controlled valve for alternately supplying hot and cold water for mixture to attain a tempered water of a substantially uniform temperature, a valve body having hot and cold water inlets, an outlet from said valve body, a first thermal element in heat sensing relation with respect to the flow of water through said outlet and controlling the alternate flow of hot and cold water through said outlet, a carrier on the outside of said body and movable relatively to said body upon operation of said thermal element, an operating member movably mounted on said carrier and operable to alternately effect the flow of hot and cold water through said outlet to effect a first tempered temperature of the mixed water, a second thermal element movably mounted in said carrier and operable to bring said operating member into an operating position to change the proportions of the flow of hot and cold water through said outlet and effect a second controlled temperature of the tempered water, electrically energizable means for heating said second thermal element to shift said operating member into engagement with said carrier to change the effective control temperature of said first thermal element, and means accommodating retractible movement of said second thermal element to maintain said operating member into engagement with said carrier, comprising a switch in the energizing circuit to said electrically energizable means and positioned within said carrier to engage said second thermal element and operated by retractible movement of said second thermal element to deenergize said electrically energizable means upon engagement of said operating member with said carrier.

9. In a thermostatically controlled valve for alternately supplying hot and cold water for mixture to attain a tempered water of a substantially uniform temperature, a valve body having hot and cold water inlets, an outlet from said valve body, a first thermal element in heat sensing relation with respect to the flow of water through said outlet and controlling the alternate flow of hot and cold water through said outlet, a carrier on the outside of said body and movable relatively to said body upon operation of said thermal element, an operating member movably mounted on said carrier and operable to alternately effect the flow of hot and cold water through said outlet to effect a first tempered temperature of the mixed water, a second thermal element movably mounted in said carrier and operable to bring said operating member into an operating position to change the proportions of the flow of hot and cold water through said outlet and effect a second controlled temperature of the tempered water, electrically energizable means for heating said second thermal element to shift said operating member into engagement with said carrier to change the effective control temperature of said first thermal element, and adjustment means for adjusting movement of said carrier required to attain a first controlled temperature of the mixed water and for adjusting the required movement of said operating member to come into engagement with said carrier to attain a second controlled temperature of the tempered water.

10. In a thermostatically controlled valve for alternately supplying hot and cold water for mixture to attain a tempered water of a substantially uniform temperature, a valve body having hot and cold water inlets, an outlet from said valve body, a first thermal element in heat sensing relation with respect to the flow of water through said outlet and controlling the alternate flow of hot and cold water through said outlet, a carrier on the outside of said body and movable relatively to said body upon operation of said thermal element, an operating member movably mounted on said carrier and operable to alternately effect the flow of hot and cold water through said outlet to effect a first tempered temperature of the mixed water, a second thermal element movably mounted in said carrier and operable to bring said operating member into an operating position to change the proportions of the flow of hot and cold water through said outlet and effect a second controlled temperature of the tempered water, electrically energizable means for heating said second thermal element to shift said operating member into engagement with said carrier to change the effective control temperature of said first thermal element, means accommodating retractible movement of said second thermal element to maintain said operating member into engagement with said carrier, and adjustment means for adjusting movement of said carrier required to attain a first controlled temperature of the mixed water and for adjusting the required movement of said operating member to come into engagement with said carrier to attain a second controlled temperature of the mixed water.

11. In a thermostat, a passageway member adapted to have hot and cold water alternately flow therethrough, a first thermal element mounted on said passageway member in heat association with the water flowing therethrough and having a power member on the outside of said passageway member extensible in the temperature range of operation of said thermal element, a carrier on the outside of said passageway member and enclosing said first thermal element, spring means returning said power member upon certain reductions in temperature, an operating member movably mounted on said carrier and operated by extensible movement of said power member of said first thermal element, a switch in spaced relation with respect to said operating member and operated thereby upon extensible movement of said power member, to change the temperature of water flowing through said passageway member, a second thermal element mounted in said carrier having a casing bodily movable with respect thereto and having an extensible power member having operative connection with said operating member and bodily moved to effect operation of said operating member by extensible movement of said power member of said first thermal element, a resistor heater energizable to heat said casing of said second thermal element and effect extensible movement of the power member thereof, to position said operating member to vary the proportions of hot and cold water flowing through said passageway member from the proportions attained solely by operation of said first thermal element, and a second switch operated by retractible movement of said power member of said second thermal element for periodically deenergizing said electrically energizable means upon heating of said second thermal element and a predetermined travel of the power member thereof, to maintain said operating member in an adjusted position of operation.

12. In a thermostatically controlled valve for alternately supplying hot and cold water for mixture to attain a tempered water of a substantially uniform temperature, a valve body having hot and cold water inlets, an outlet from said valve body, a first thermal element in heat sensing relation with respect to the flow of water through said outlet and controlling the alternate flow of hot and cold water through said outlet, a carrier on the outside of said valve body, an operating member movably mounted on said carrier and operable to alternately effect the flow of hot and cold water through said outlet to effect a first tempered temperature of the mixed water, a second thermal element movably mounted in said carrier and operable to bring said operating member into an operating position to change the proportions of the flow of hot and cold water through said outlet and effect a second controlled temperature of the tempered water, electrically energizable means for heating said second thermal element to shift said operating member in position to change the effective control temperature of said first thermal element, means accommodating retractible movement of said second thermal element to maintain said operating member in an adjusted temperature control position, and adjustment means for adjusting movement of said second thermal element required to attain a first controlled temperature of the mixed water and for adjusting the required movement of said operator to attain a second controlled temperature of the mixed water.

References Cited in the file of this patent

UNITED STATES PATENTS

| | | |
|---|---|---|
| 1,225,887 | Swan | May 15, 1917 |
| 2,146,930 | Bassett | Feb. 14, 1939 |
| 2,216,246 | Larson | Oct. 1, 1940 |
| 2,280,667 | Scott | Apr. 21, 1942 |
| 2,489,896 | Kempton | Nov. 29, 1949 |
| 2,624,325 | Fricke et al. | Jan. 6, 1953 |